Feb. 8, 1938.  A. O. RUSSELL  2,107,805
DIALYZERS
Filed May 21, 1935  3 Sheets-Sheet 1
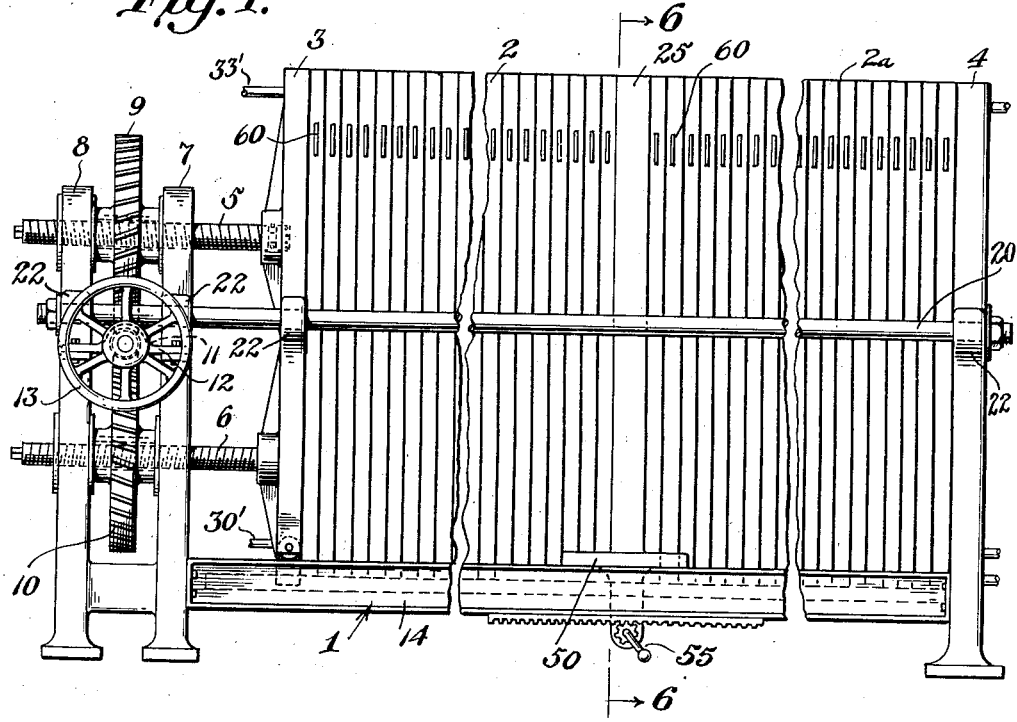
Fig. 1.
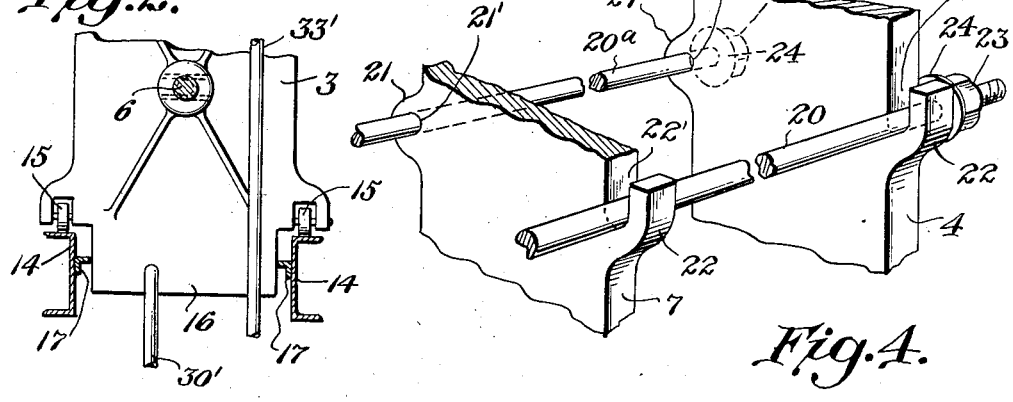
Fig. 2.  Fig. 4.
Fig. 3.
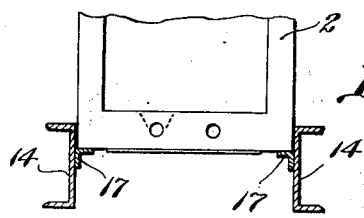
Inventor
Arthur O. Russell
By Eugene K. Purdy
his Attorney

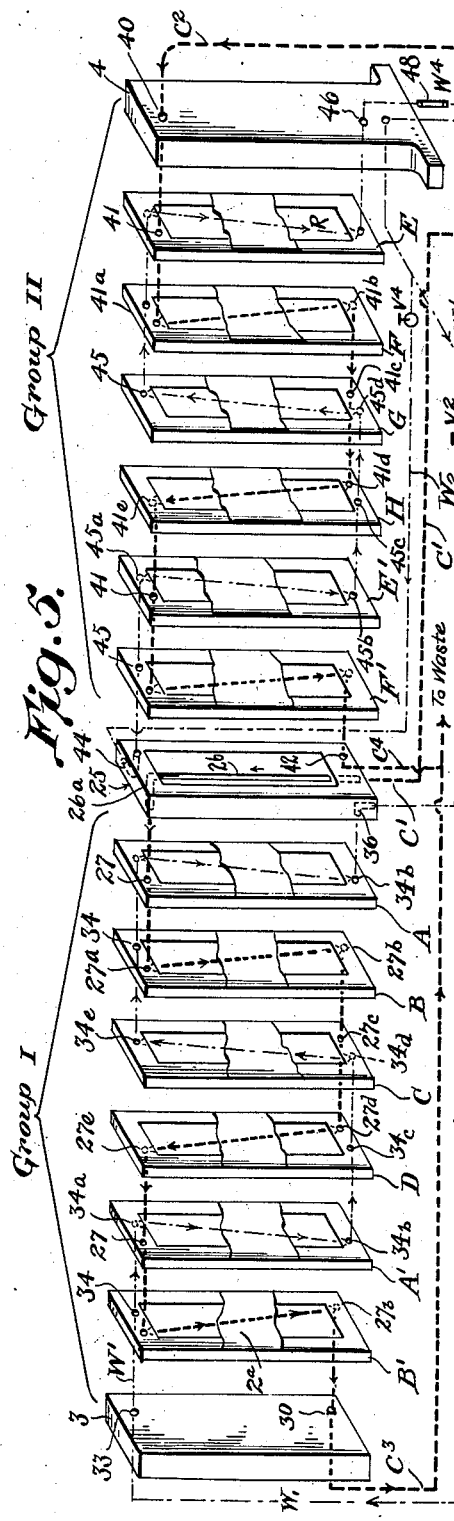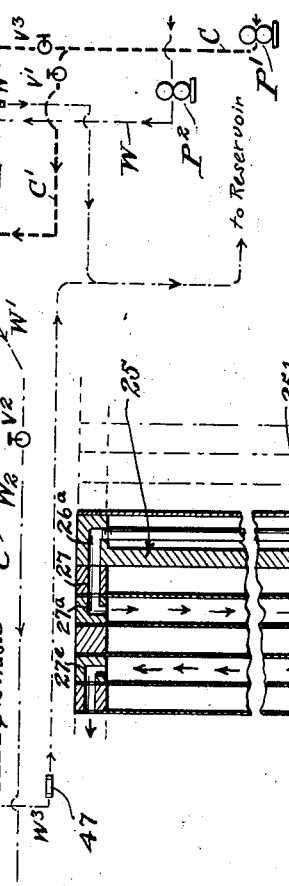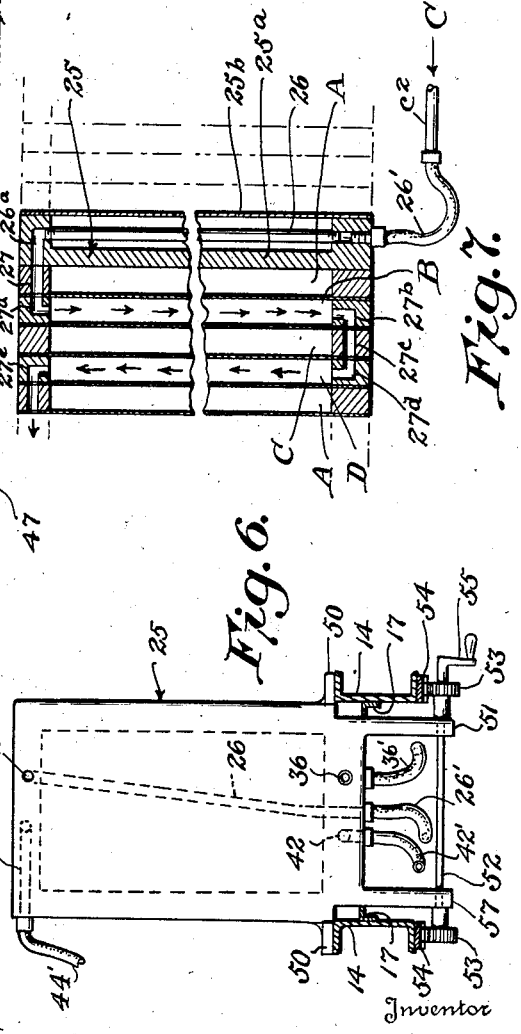

Feb. 8, 1938.　　　　A. O. RUSSELL　　　　2,107,805
DIALYZERS
Filed May 21, 1935　　　　3 Sheets-Sheet 3

Inventor
Arthur O. Russell

Patented Feb. 8, 1938

2,107,805

UNITED STATES PATENT OFFICE 2,107,805

DIALYZERS

Arthur O. Russell, Port Chester, N. Y.

Application May 21, 1935, Serial No. 22,669

15 Claims. (Cl. 23—252)

This invention relates to dialyzers used for the recovery of the desirable constituents of solutions by the principle of osmosis.

In the manufacture of viscose in the artificial silk industry dialyzers have found useful application in the reclamation of caustic soda from the liquor expressed from the pulp boards before removal of these boards from the steeping tanks. This press liquor is laden with impurities, principally hemicellulose in colloidal suspension, which renders it unfit for reuse in the steeping tanks although still retaining in solution a substantial content of unconsumed sodium hydroxide. One common type of dialyzer employed for recovering this caustic soda comprises a series of upright skeleton frames clamped together in a press in liquid-tight engagement having diaphragms, made for example of thin parchment paper, disposed between the frames. The impure caustic solution is circulated through alternate frames and wash water is passed through the other frames which results in diffusion of the pure sodium hydroxide through the diaphragms by osmotic pressure where it is taken up by the wash water flowing on the other sides of the diaphragms.

The volumes of impure caustic solution and wash water flowing through the dialyzer are preferably so proportioned that the wash water by the time it has completed its travel through the apparatus, has absorbed a substantial quantity of NaOH and hence is available for employment in the steeping tanks.

While such dialyzers have proved sound in principle and commercially profitable in operation, their construction, which up to this time has been patterned generally along the lines of the conventional filter press, involves certain objectionable features from the standpoint of maintenance. For example the frames, which usually measure several feet in height and may frequently number one hundred and fifty or more to a single apparatus, are designed to be supported upon two fixed horizontal tension rods which extend along opposite sides of the press and which tie together its two ends; thus, when a rupture develops in any of the diaphragms, in order to make an examination to determine in which frame the trouble lies, it is necessary for the attendant to unclamp the press and dismantle the frames, lifting each frame vertically out of the apparatus.

This is a laborious and time-consuming operation, not only because the dimensions of the frames render their handling difficult but also because of the actual physical labor involved in lifting the relatively heavy cast-iron frames over the tension rods. Often, also, the clearance above the dialyzer is so restricted as to introduce an additional annoyance into the removal of these frames from the press.

Still another objection to this type of dialyzer which follows from the disadvantage just mentioned resides in the time lost in conducting an examination of the frames to discover in which particular frame or frames a ruptured diaphragm exists. Heretofore it has been necessary to cut the dialyzer out of service and then to check the frames one by one to determine their condition. With the growing tendency toward the use of thinner parchment papers as dialytic membranes, which papers while more efficient possess a correspondingly greater susceptibility to failure, reduction of the time element in making diaphragm replacements becomes increasingly important in maintaining operation of the plant at maximum capacity.

It is an object of my invention to overcome the above disadvantage by providing a dialyzer in which the press is so constructed and arranged as to permit lateral removal of the frames and hence their more convenient and speedy disassociation from the apparatus. This, in the preferred form of my invention, is accomplished by providing means for supporting the frames at or adjacent their lower ends and constructing at least one of the horizontal tension rods to permit its movement clear of the frames so that the latter may be pulled sidewise from the press. As a consequence servicing of the dialyzer is greatly expedited.

Another object of my invention is to provide a dialyzer having a plurality of independent groups or banks of frames, each group having separate inlet and outlet connections for the carrier and wash liquids passing therethrough. The arrangement is such that when a diaphragm bursts in any frame, as indicated by the character of the wash water containing the reclaimed sodium hydroxide passing out of the apparatus, it is simply necessary to dismantle the particular group of frames including the defective diaphragm, instead of tearing down the entire lot of frames in making an examination according to present practice.

To facilitate the accomplishment of this object, the invention in its preferred form contemplates the provision of means allowing independent inspection of the liquors passing out of the several groups of frames. Thus, by noting the color or cast of the wash water discharged from each group of frames, it is possible to determine promptly the existence of a broken diaphragm and, still more important, in which group such diaphragm is located. This allows cutting out of operation the faulty group of frames before contamination of the wash water by the impure liquor has proceeded to a harmful degree. Repairs can then be made at the convenience of the attendant in charge while maintaining only a portion of the apparatus idle.

A further object of the invention is to provide a dialyzer in which the circulating system for the caustic solution and the wash water is so designed as to eliminate the need of auxiliary suction pumps such as are now commonly employed with dialyzers of the capacity used in the artificial silk industry to assist the pressure pumps in moving the liquids through the apparatus.

The invention has for an additional object to provide manipulative means for making quick attachment of the diaphragms to the frames and releasably holding the diaphragms in place when the frames are removed from the apparatus.

Other objects and advantages will become apparent from the following detailed description of a preferred embodiment of my invention, reference being made to the annexed sheets of drawings in which:

Figure 1 is a side elevation of a dialyzer embodying the features of the invention, a portion of the dialytic frames and parts of the press structure being broken away so as to afford a contracted view of the apparatus;

Figure 2 is a front elevation of the lower end of the front end plate showing in section the track for supporting this plate;

Figure 3 is a front view of the lower end of a dialytic frame illustrating how the frames are supported in the press;

Figure 4 is an isolated showing of a portion of the press disclosing the manner in which the tension rods are mounted therein;

Figure 5 is a flow diagram of the dialyzer illustrating the paths traveled by the liquids in passing therethrough;

Figure 6 is cross-section through the dialyzer on the line 6—6 of Figure 1 showing the distributor box in front elevation;

Figure 7 is a cross-section through the distributor box of Figure 6 and several adjacent frames indicating the direction of flow of the impure caustic solution;

Figure 9:
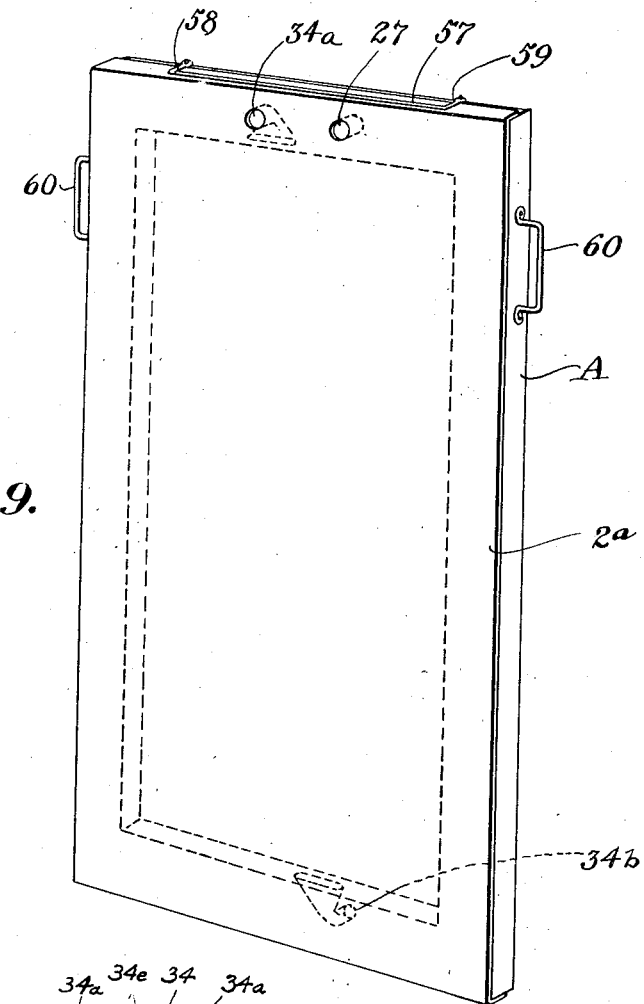

As best shown in Figure 1 the dialyzer comprises in general a press 1 and a series of rectangular skeleton frames 2 assembled in the press. The press includes a movable front end plate 3 and a stationary rear end plate 4, the cast iron frames 2 being clamped together in upright position between the end plates. Diaphragms 2a, made for example of a thin parchment paper, are interposed between the frames so as to close the frames and form diffusion membranes separating the liquids flowing in adjacent frames as will be later explained.

For moving the front end plate 3 into and out of clamping engagement with the frames there is provided a pair of horizontal screw-threaded shafts 5 and 6 swiveled at one of their ends to the front end plate near its top and bottom. These shafts which are oppositely threaded have their outer ends extended through and threaded within stationary upright castings 7 and 8 located at the front of the press. Slidingly keyed to each of the shafts 5 and 6 are worm wheels 9 and 10, respectively, arranged between and held from end play by the two castings 7 and 8, so that upon rotation of these worm wheels in reverse directions the threaded shafts are screwed inwardly and outwardly through the castings to shift the front end plate 3 toward and from the frames. To facilitate this operation there is provided a worm 11 meshing with the worm wheels 9 and 10. This worm is carried on the end of a horizontal shaft projecting sidewise from the press and journaled in a bearing 12 which latter is supported on brackets formed on the two castings 7 and 8. A hand wheel 13 on the outer end of the shaft permits rotation of the worm.

Connecting the rear end plate 4 and the casting 7 near the floor level of the press is a pair of channels 14. These channels are arranged in parallel on opposite sides of the press to which they are secured with their webs lying in vertical planes and their flanges disposed horizontally outward. As best illustrated in Figure 2, the front end plate 3 is equipped at its lower end with rollers 15 which travel upon the upper flanges of the channels, and the lower end of the front end plate is formed with a tail 16 projecting down between the channels 14.

Two angles 17 are fastened to the inner opposed faces of the vertically disposed webs of the channels 14 and the lower ends of the frames 2 are designed to fit between the channels and rest upon the steps formed by the horizontal flanges of the angles 17. These steps are located a short distance below the top of the channels so as to form in conjunction with the channels a shallow pocket for receiving the lower ends of the frames and supporting the frames in alignment, as will more clearly appear from Figure 3.

Traversing the length of the press on its opposite sides are two tension rods 20 and 20a (Figure 4) which take up the longitudinal stress imposed on the frame when the dialytic frames are tightly clamped between the front and rear end plates 3 and 4. Heretofore these tension rods have been incorporated as a fixed part of the apparatus so that in removing the frames from the press it has been necessary to lift them over the tension rods. In order to expedite the removal of the frames and render this task less laborious, I provide a quick releasable connection between one of the tension rods and the press so that the rod can be moved clear of the frames.

This is constructed as follows: Projecting outwardly on opposite sides and adjacent the upper ends of the front and rear end plates 3 and 4 and castings 12 and 13 are ears 21 and 22, these ears terminating a short distance beyond the planes formed by the vertical sides of the series of dialytic frames 2. Aligned transverse holes 21' are formed in the ears 21 through which extends the tension rod 20a. The two ends of this rod (one end of which is disclosed in Figure 4) are provided with nuts 23 and bearing collars 24, forming heads or abutments to prevent yielding of the casting 8 and rear end plate 4 when tension is imposed on the rod upon closing the press. On the other side of the press the ears 22 are formed with upwardly opening slots 22' adapted to slidably receive the tension rod 20, which is similarly provisioned on its ends with nuts 23 and bearing collars 24. By this construction the tension rod 20 may be slipped into and out of slots 22' when the press is unclamped and the rods are not under tension so as to permit the frames to be moved sidewise from the press after disengagement of the lower ends of the frames from the pocket between the channels 14.

Referring now to the circulating system for the impure caustic soda solution and the wash water including the externally-opening orifices through which the liquids are introduced into and removed from the apparatus, this system is best illustrated by the diagram of Figure 5.

In this figure at the extreme right is indicated by the letter C the line carrying the impure caustic solution squeezed from the pulp boards before they are taken from the steeping tanks. This liquor which I term the carrier liquid, is delivered to the dialyzer by a force pump $P^1$ in circuit with line C. This line divides into two branches, $C^1$ and $C^2$, one of these branches $C^1$ leading to a cast iron distributor box 25, interposed within the series of dialytic frames so as to partition these frames into two approximately equal groups which for convenience I designate Groups I and II. Each group may embrace, for example, seventy-five frames. The other branch $C^2$ passes to the rear end plate 4.

The partitioning frame constituting the distributor box 25 is made of cast iron and corresponds in general outline to a dialytic frame although of slightly greater thickness. One end of the distributor is closed by an integral wall 25a and its other end is closed by a metal cover 25b, thus providing two opposite flat faces designed to abut and close the adjacent dialytic frames.

Within its interior a pipe 26 forms a passageway (Figure 7) extending through the bottom of the distributor box upwardly to adjacent its top where it communicates with a left turn passageway 26a opening through the wall 25a to the front of the distributor box. From the passageway 26a the impure caustic solution is circulated through the frames composing Group I and flooding alternate frames, as indicated by the heavy dash lines in Figure 5. Frame A, the initial frame encountered by the liquor, is provided with a through port 27, by-passing the caustic liquor around this frame. This port 27 communicates with a down-turn port 27a in the top of the succeeding frame B which latter port is formed with a bend leading into the interior of the frame. The impure caustic flows down through this frame and makes its exit by way of a left-turn port 27b in the bottom of the frame, which in turn communicates with a through port 27c in the following frame C. The through port 27c connects with an upturn port 27d in the frame D allowing the solution to pass into the bottom of this frame and out at its top via a left-turn port 27e. This completes one cycle of flow of the liquor through four frames of the group, as indicated in Figure 7. The liquor next passes from port 27e into a through port in the adjacent frame $A^1$, this frame being a duplicate of the frame A, the solution continuing its travel through the remaining frames of the groups via the system of communicating ports just described.

After traversing the frames of Group I the liquor, from which a large part of its caustic soda now has been abstracted, leaves the final frame $B^1$ through a left-turn port 27b in communication with a passageway 30 in the front end plate 3 and passes to waste via a discharge line $C^3$.

In a somewhat similar manner pure water, which I term the wash liquid, is conducted through the system although flowing in counter-current relation to the impure caustic solution. At the right of Figure 5 is shown a line, designated W, through which the wash water is delivered by a force pump $P^2$ to the dialyzer. This line divides into two branches, one branch $W^1$ leading to the frames of Group I and the other branch $W^2$ extending to the frames of Group II. As a matter of expediency the wash water line W is led into the dialyzer through a coupling passing through the rear end plate 4 near the floor level so that the branches $W^1$ and $W^2$ of this line are located in an out-of-the-way position in the space below the dialytic frames. The branch $W^1$ connects with a passageway 33 near the upper end of the front end plate 3 through which the solution enters the frames of Group I, the course of travel of this wash water being traced by the dot-and-dash lines of Figure 5. Entering the through port 34 of frame $B^1$, the wash water is by-passed around this frame, and flows into down-turn port 34a communicating with frame $A^1$. After flooding this frame the water passes out by way of right-turn port 34b into through port 34c in the bottom of frame D and thence into upturn port 34d leading into frame C. After rising through this frame the water escapes by way of right turn port 34e and enters through port 34 of the following frame B.

Figure 8:
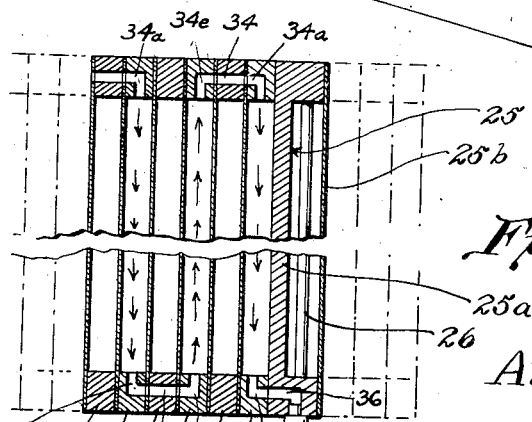
Figure 8 is a cross-section through the distributor box and frames of Figure 7 showing the course taken by the wash water; and, Figure 9 is a perspective of a dialytic frame illustrating the spring clips mounted on opposite ends of the frame for fastening a diaphragm to the frame.

This concludes one cycle of its movement through the system, as more clearly indicated in Figure 8. The water continues its passage through the frames composing the group until it is ultimately expelled by way of right-turn port 34b of final frame A into a passageway 36 in the distributor box 25. This passageway is connected to a discharge line $W^3$ which delivers the wash water, now laden with reclaimed caustic soda, into a reservoir (not shown) from which, after the addition of such supplemental amount of NaOH as may be necessary to raise the solution to proper strength, it may be drawn off for use in the steeping tanks.

Thus, the liquids are continuously introduced into and removed from the apparatus through the orifices 26, 30, 33, 36, 40, 42, 44 and 46 opening externally of the apparatus. As will be readily seen, by virtue of this counter-current movement of impure caustic solution and wash water through the series of dialytic frames composing Group I, the pure wash water initially encounters, figuratively speaking, the impoverished carrier liquid that is completing its journey through the system, and in the later stage of its passage through the frames the wash water becomes increasingly more heavily charged with reclaimed sodium hydroxide. However, since the impure caustic solution introduced at the other end of the frame is richer in sodium hydroxide, the wash water will continue to absorb the caustic soda from the liquor flowing on the opposite sides of the diaphragms.

In a similar manner the caustic solution and wash water is circulated through the frames of Group II except for the reversal of their respective directions of movement. Caustic soda solution flowing in the branch $C^2$ enters a passageway 40 in the rear end plate 4 where it flows into the through port 41 at the upper end of frame E. After traversing the frames of this group via ports 41a, 41b, 41c, 41d, and 41e, and flooding alternate frames as indicated in Figure 5, the waste liquid discharges from the system through a port 42 leading out from the bottom of the distributor box 25 and connected to the waste line C⁴. The wash water, on the other hand, is introduced into the frames of Group II from the branch W² connected at the top of the distributor box to a passageway 44 formed in the latter. From this passageway the water enters the through port 45 of frame F¹, progresses through ports 45a, 45b, 45c, 45d, and 45e, flooding alternate frames E¹, G, E and by-passing frames F¹, H, F and leaves the dialyzer via an outlet passageway 46 in the rear end plate 4. This wash water containing the reclaimed NaOH in solution discharges through a line W⁴ to a reservoir where it is stored for subsequent use in the steeping tanks.

For the purpose of viewing the wash waters passing out of the dialyzer, I provide in the lines W³ and W⁴ glass inspection tubes 47 and 48 so that the attendant in charge can observe the quality of the liquor coming through the apparatus. The pure caustic solution is perfectly clear, but when a diaphragm bursts allowing its dilution by the impure caustic solution, it assumes a greyish cast caused by the presence of hemicellulose and other impurities. This warns the attendant that repairs must be made and, furthermore, depending upon which of the two inspection tubes shows grey, denotes in which group of frames the trouble lies. Instead of cutting the entire apparatus out of service it is necessary for the attendant only to close the appropriate pair of valves V¹, V² or V³, V⁴, in the branches conveying the caustic liquor and wash water to the faulty group of frames without interrupting the operation of the other group.

In making repairs to the dialytic frames the front end plate is backed off from the frames and in case the trouble lies in one of the frames of Group II the distributor box must be slid to the left (Figure 1) to afford access to the frames of that group. To facilitate shifting the distributor box, I provide the following mechanism: The distributor box 25, as shown in Figure 6, is formed near its lower end with a pair of laterally extending feet 50 which rest flatly upon the top horizontal flanges of the channels 14 and solidly support the distributor box. The distributor box is provided on its lower end with a pair of spaced downwardly reaching arms 51 terminating below the channels 14. Rotatably supported within the lower ends of these arms is a transversely disposed shaft 52 having pinions 53 keyed thereto. These pinions engage racks 54 fastened to the under side of the lower flanges of the channels 14, so that when the shaft 52 is rotated, as by means of a crank 55 projecting from one end of the shaft, the pinions travel along the rack carrying with them the distributor box 25. After repairs have been made the distributor box may be returned to its original position by merely closing the front end plate into clamping engagement with the frames without the necessity of manually operating the crank 55.

In order to permit the movement of the front end plate 3 and the distributor box 25 along the channels 14, flexible hose couplings are provided. Such couplings are interposed in the lines C¹, C⁴ and W², W³ connected to the distributor box, and in the lines C³, W¹ connected to the front end plate 3. These couplings are designated 30' and 33' in Figure 2, being the primes of the numbers referring to the passageways in the front end plate with which they communicate; and are designated 26', 36', 42' in Figure 6, being the primes of the numbers designating the passageways in the distributor box with which they connect.

Heretofore in dialyzers of the style and capacity commonly employed in the artificial silk industry, it has been the practice in order to obtain an equalized pressure of the liquids in the various frames throughout the apparatus, to carry the liquids to opposite extremities of the press before admitting the liquids to the inside of the frames. This increases the paths of travel of the liquids and consequently the frictional resistance to be overcome by the pressure pumps. As a result, in order to accomplish this circulation, auxiliary suction pumps are usually provided to relieve the load on the force pumps. However by dividing the dialyzer into a plurality of groups of frames each group having, in effect, an independent circulating system of such a length that the liquids may be directly forced therethrough without imposing an unduly high pressure on the diaphragms of the initial frames, I am enabled to dispense with these auxiliary pumps and obtain entirely satisfactory results by the employment of only two force pumps P¹ and P².

For convenience in associating the diaphragm with the dialytic frames so that the thin paper membranes will be maintained tautly stretched upon the frames when the latter are removed from the press, spring clips 57 are provided on opposite ends of each frame as shown in Figure 9. These clips each comprise a wire made of spring steel having its ends bent so as to form a pair of parallel legs 58 and 59 the terminals of which are bolted to the frame. By this construction the clip may be flexed to insert an end of the diaphragm thereunder but upon its release will snap back against the frame to resiliently clamp the diaphragm in place. To facilitate handling of the frames, they may be provided with grab irons 60 on their opposite sides as shown in this figure.

While I have disclosed in the preferred embodiment of my invention just described only one distributor box, manifestly more than one may be employed. Ordinarily one distributor box to every one hundred and fifty frames will be found quite satisfactory. But by employing a plurality of distributor boxes the capacity of the dialyzer may be increased to an extent limited only by the number of frames capable of being accommodated by the press. On the other hand if an increase in capacity is not a desideratum the addition of distributor boxes may serve to reduce the number of frames to a group so as to effect a saving of time in making diaphragm replacements.

It will also be apparent from Figure 9 that the frames may be constructed according to a single pattern and that in order to build up the system of communicating ports represented in Figure 5 it is only necessary to associate the frames in reversed or upturned relation so as to match up the ports. This has the advantage of economy in the manufacture of the apparatus.

I claim:

1. A dialyzer comprising a press having vertically disposed stationary members at its opposite ends, a series of dialytic frames arranged in face-to-face relation intermediate the stationary members, a support for said frames engaging the lower ends of the frames, a plate movable to clamp the frames against one of said stationary members, a pair of tension rods extending lengthwise of the press between the stationary members upon opposite sides thereof and intermediate the height of the frames, said rods normally obstructing the removal of the frames laterally from the press, and one of said rods having a quick-releasable head-and-slot connection with the stationary members to facilitate clearing one side of the press to allow the lateral removal of the frames therefrom, said head-and-slot connection including downwardly extending slots and abutments upon the tension rod overlying the distantly-disposed faces of the stationary members adjacent the slots.

2. A dialyzer comprising a press having vertically disposed stationary members at its opposite ends, a series of upright dialytic frames arranged in face-to-face relation intermediate the stationary members, a track for supporting the frames adjacent their lower ends, a plate movable to clamp the frames against one of said stationary members, a pair of tension rods extending lengthwise of the press between the stationary members upon opposite sides thereof and intermediate the height of the frames, said rods normally obstructing the removal of the frames laterally from the press, and one of said rods having a quick-releasable head-and-slot connection with the stationary members to facilitate clearing one side of the press to allow the lateral removal of the frames therefrom, said head-and-slot connection including downwardly extending slots and abutments upon the tension rod overlying the distantly-disposed faces of the stationary members adjacent the slots.

3. A dialyzer comprising a press, a series of dialytic frames adapted to be clamped in face-to-face engagement within the press, permeable diaphragms disposed between adjacent frames, a system of communicating ports defining separate liquid-conducting passageways each extending serially through alternate frames, a distributor located intermediate the series of frames and dividing the frames into adjacent groups, said distributor providing extensions of the liquid-conducting passageways of each group of frames leading externally of the distributor, and external orifices communicating with said liquid-conducting passageways of the adjacent groups of frames at points remote from the distributor.

4. A distributor box for use with dialyzers, comprising a relatively flat frame adapted to be supported in vertical position, a pair of fluid passages opening to one face of the frame and another pair of fluid passageways opening to the opposite face of said frame, said pairs of fluid passageways leading externally through the perimetral edge of the frame.

5. A distributor box for use with dialyzers comprising a relatively flat frame adapted to be supported in vertical position, a pair of fluid passages opening to one face of the frame and another pair of fluid passages opening to the opposite face of the frame, said pairs of fluid passageways being inversely positioned upon opposite faces of the frame and leading externally through the perimetral edge of the frame.

6. A dialyzer comprising a press having front and rear end plates, a series of upright dialytic frames arranged in face-to-face relation between the end plates with permeable diaphragms disposed between the frames, means for moving one of the end plates into and out of clamping engagement with the frames, a distributor box segregating said series of frames into two adjacent groups of frames, ports formed in the frames of each group so constructed and arranged to form independent circulating systems for a carrier liquid and a wash liquid, passageways in the distributor box communicating with said systems, and means for moving the distributor box toward and from one group of frames.

7. In a dialytic skeleton frame of generally rectangular shape adapted to have assembled therewith a permeable diaphragm covering one of its open faces, a spring clip mounted on an end of the frame for releasably clamping an end of the diaphragm.

8. A dialyzer comprising a series of dialytic frames arranged in face-to-face relation, permeable diaphragms disposed between adjacent frames, a system of communicating ports so constructed and arranged to provide separate passageways each extending serially through alternate frames, a partitioning member dividing said frames into two adjacent groups and interrupting communication of the passageways between the groups of frames, a delivery conduit leading from a source of liquid supply and having branches communicating with one of the passageways of each group of frames, a second delivery conduit leading from a different source of liquid supply and having branches communicating with the other of said passageways of each group of frames, and separate discharge conduits for removing the liquids flowing from each group of frames.

9. A dialyzer comprising a series of dialytic frames arranged in face-to-face relation, permeable diaphragms disposed between adjacent frames, a system of communicating ports so constructed and arranged to provide separate liquid-conducting passageways extending serially through alternate frames, a distributor located intermediate the series of frames, said distributor dividing the frames into two adjacent groups and interrupting communication of the passageways between the groups of frames, conduits connected with the passageways of each group of frames at one of its ends, and conduits carried by the distributor communicating with the passageways of each group of frames at its opposite end, said conduits communicating with the exterior of the apparatus.

10. A dialyzer comprising a series of upright dialytic frames arranged in face-to-face relation, permeable diaphragms disposed between adjacent frames, a system of communicating ports so constructed and arranged to provide separate liquid-conducting passageways each extending serially through alternate frames, a distributor located intermediate the series of frames and dividing the frames into two adjacent groups, means for passing liquids through the separate passageways of each group of frames including an offtake carried by the distributor communicating with one of the passageways for continuously venting liquid therefrom, and means in circuit with said offtake exteriorly of the dialyzer to permit inspection of the liquid passing through said offtake.

11. A dialyzer comprising a series of upright dialytic frames arranged in face-to-face relation, permeable diaphragms disposed between adjacent frames, a system of communicating ports providing separate liquid-conducting passageways each extending serially through alternate frames, a distributor located intermediate the series of frames and dividing the frames into two adjacent groups, means for passing liquids through the separate passageways of each group of frames including an offtake carried by the distributor communicating with one of the passageways for continuously venting liquid therefrom, and a transparent inspection element in circuit with said offtake to permit examination of the liquid passing through said offtake exteriorly of the dialyzer.

12. A dialyzer comprising a press, a series of upright dialytic frames adapted to be clamped in face-to-face engagement within the press, permeable diaphragms disposed between adjacent frames, a system of communicating ports defining a pair of liquid-conducting passageways, each passageway extending serially through alternate frames, partitioning means located intermediate the series of frames and segregating the frames into adjacent, independently-operable groups, externally-opening orifices communicating with the pair of liquid-conducting passageways of each group of frames and adapted to be connected to conduits disposed externally of the apparatus for the passage of liquids through the pair of liquid-conducting passageways of one group of frames independently of the other group.

13. A dialyzer comprising a press, a series of upright dialytic frames adapted to be clamped in face-to-face engagement within the press, permeable diaphragms disposed between adjacent frames, a system of communicating ports defining a pair of liquid-conducting passageways, each passageway extending serially through alternate frames, partitioning means located intermediate the series of frames and segregating the frames into adjacent independently-operable groups, and externally-opening orifices communicating with the pair of liquid-conducting passageways of each group of frames for the introduction into and removal of liquid from one group of frames independently of the other group, certain of said orifices being associated with the partitioning means.

14. A dialyzer comprising a press, a series of upright dialytic frames adapted to be clamped in face-to-face engagement within the press, permeable diaphragms disposed between adjacent frames, a system of communicating ports defining a pair of liquid-conducting passageways, each passageway extending serially through alternate frames, a distributor located intermediate the series of frames and segregating the frames into adjacent independently-operable groups, externally-opening orifices communicating with the pair of liquid-conducting passageways of each group of frames for the introduction into and removal of liquid from one group of frames independently of the other group, certain of said orifices being associated with the distributor, and external liquid-supply and liquid-discharge conduits connected to said orifices.

15. A dialyzer comprising a press having front and rear end clamping plates, a series of upright dialytic frames adapted to be clamped in face-to-face engagement between the clamping plates, permeable diaphragms disposed between adjacent frames, a system of communicating ports defining a pair of liquid-conducting passageways, each passageway extending serially through alternate frames, a distributor located intermediate the series of frames and segregating the frames into adjacent independently-operable groups and means for passing liquids through the groups of frames, said means including externally-opening orifices associated with the distributor communicating with one end of the pair of liquid-conducting passageways of a group of frames, and externally-opening orifices associated with one of the clamping plates communicating with the other end of said pair of liquid-conducting passageways of said last-mentioned group of frames.

ARTHUR O. RUSSELL.